US009710498B2

(12) United States Patent
Kang et al.

(10) Patent No.: US 9,710,498 B2
(45) Date of Patent: Jul. 18, 2017

(54) METHOD AND SYSTEM FOR CONSTRUCTING DATABASE FOR PRODUCT DEMAND/SUPPLY CONNECTION NETWORK

(75) Inventors: Jong Seok Kang, Goyang-si (KR); Seong Hwa Hong, Seoul (KR); Hyuck Jai Lee, Seoul (KR); Se Jung Ahn, Seoul (KR); Hyun Sang Jung, Busan (KR); Yeong Ho Moon, Seoul (KR)

(73) Assignee: KOREA INSTITUTE OF SCIENCE AND TECHNOLOGY INFORMATION, Daejeon (KR)

( * ) Notice: Subject to any disclaimer, the term of this patent is extended or adjusted under 35 U.S.C. 154(b) by 251 days.

(21) Appl. No.: 14/385,712

(22) PCT Filed: May 11, 2012

(86) PCT No.: PCT/KR2012/003693
§ 371 (c)(1),
(2), (4) Date: Sep. 16, 2014

(87) PCT Pub. No.: WO2013/141443
PCT Pub. Date: Sep. 26, 2013

(65) Prior Publication Data
US 2015/0032779 A1 Jan. 29, 2015

(30) Foreign Application Priority Data
Mar. 20, 2012 (KR) .................. 10-2012-0028028

(51) Int. Cl.
*G06F 17/30* (2006.01)
*G06Q 10/06* (2012.01)
(Continued)

(52) U.S. Cl.
CPC ....... *G06F 17/30292* (2013.01); *G06Q 10/06* (2013.01); *G06Q 50/184* (2013.01); *H04L 41/50* (2013.01)

(58) Field of Classification Search
CPC ................................................. G06F 17/30292
(Continued)

(56) References Cited

U.S. PATENT DOCUMENTS

| 7,356,419 B1* | 4/2008 | Culot | G06F 19/709 |
| | | | 702/22 |
| 2002/0049643 A1* | 4/2002 | Church | G06Q 10/087 |
| | | | 705/37 |
| 2009/0144070 A1* | 6/2009 | Psota | G06Q 10/083 |
| | | | 705/330 |

FOREIGN PATENT DOCUMENTS

| JP | 2009-098914 A | 5/2009 |
| KR | 10-2001-0103168 A | 11/2001 |

(Continued)

OTHER PUBLICATIONS

International Search Report for International Application No. PCT/KR2012/003693.

*Primary Examiner* — Pierre Vital
*Assistant Examiner* — Alicia Antoine
(74) *Attorney, Agent, or Firm* — LRK Patent Law Firm

(57) ABSTRACT

The present invention relates to a method and system for constructing a database for a product demand/supply connection network of a technology market connection and analysis apparatus comprising a microprocessor for controlling the construction of a database for implementing a product demand/supply connection network, and further comprising the database for a product demand/supply connection network, in which information relating to the database generated in accordance with the control of the microprocessor is stored.

6 Claims, 7 Drawing Sheets

(51) Int. Cl.
*G06Q 50/18* (2012.01)
*H04L 12/24* (2006.01)

(58) Field of Classification Search
USPC .......................................................... 707/803
See application file for complete search history.

(56) References Cited

FOREIGN PATENT DOCUMENTS

KR    10-2003-0039576 A    5/2003
KR    10-2011-0121014 A    11/2011

\* cited by examiner

[FIG. 1]
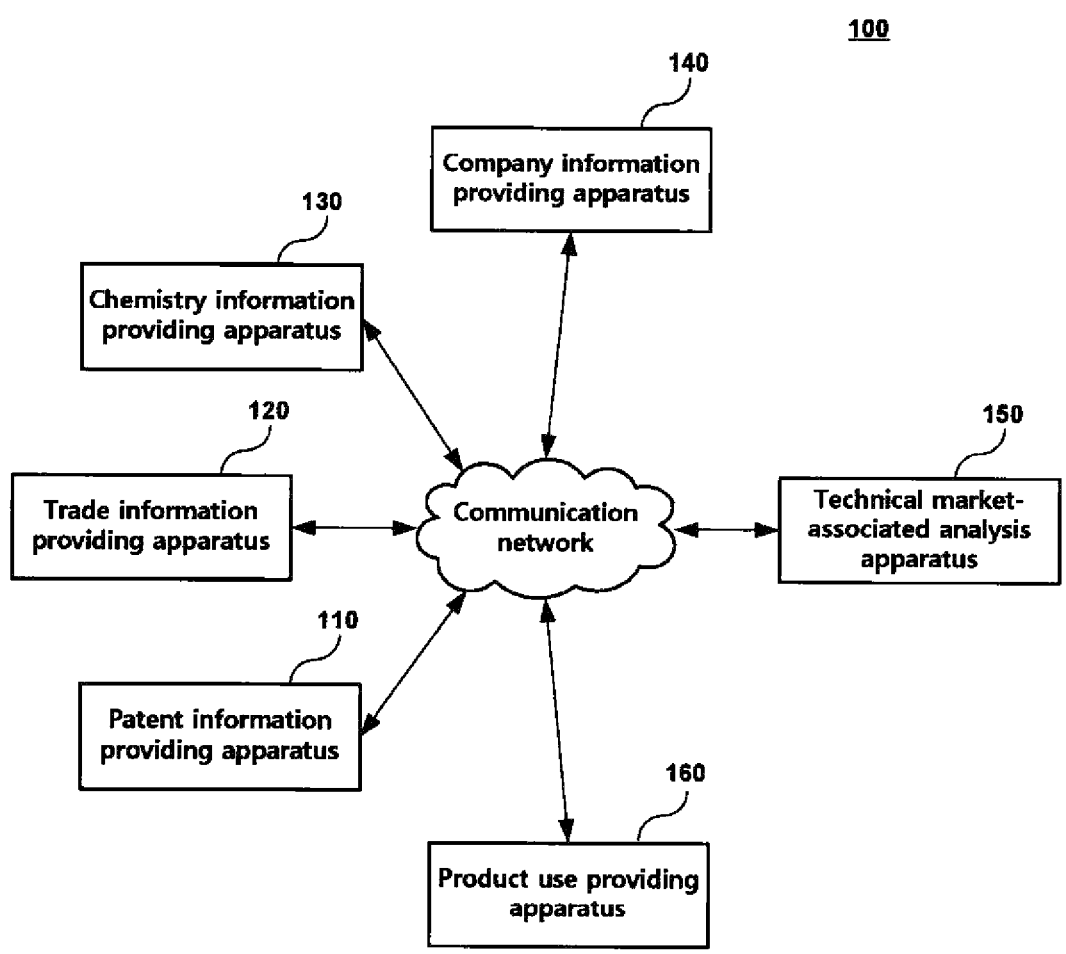

[FIG. 2]
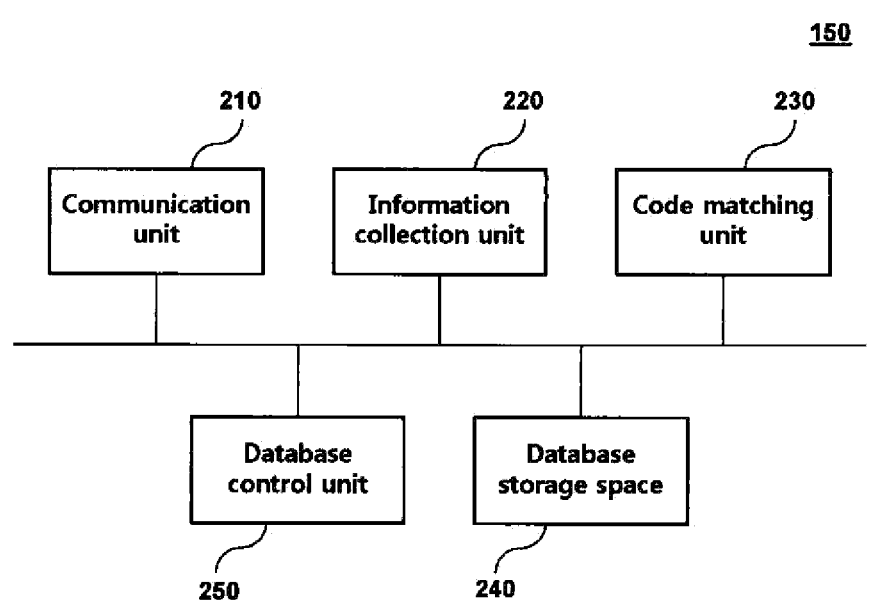

[FIG. 3]
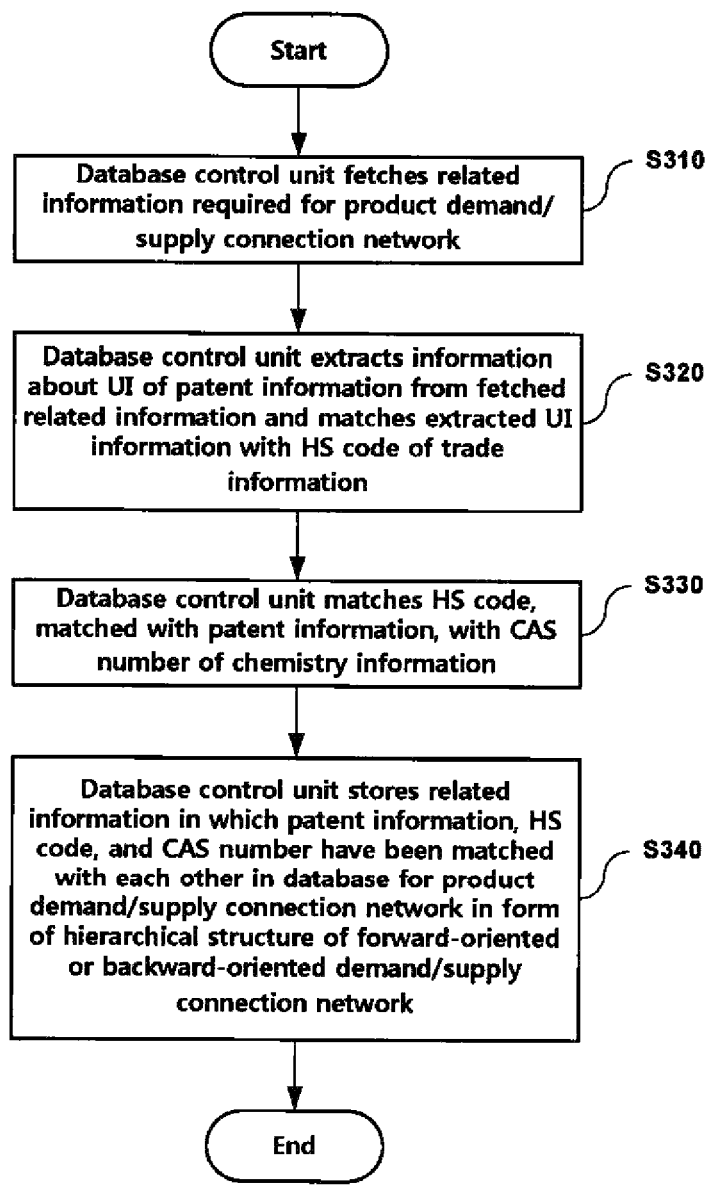

[FIG. 4]
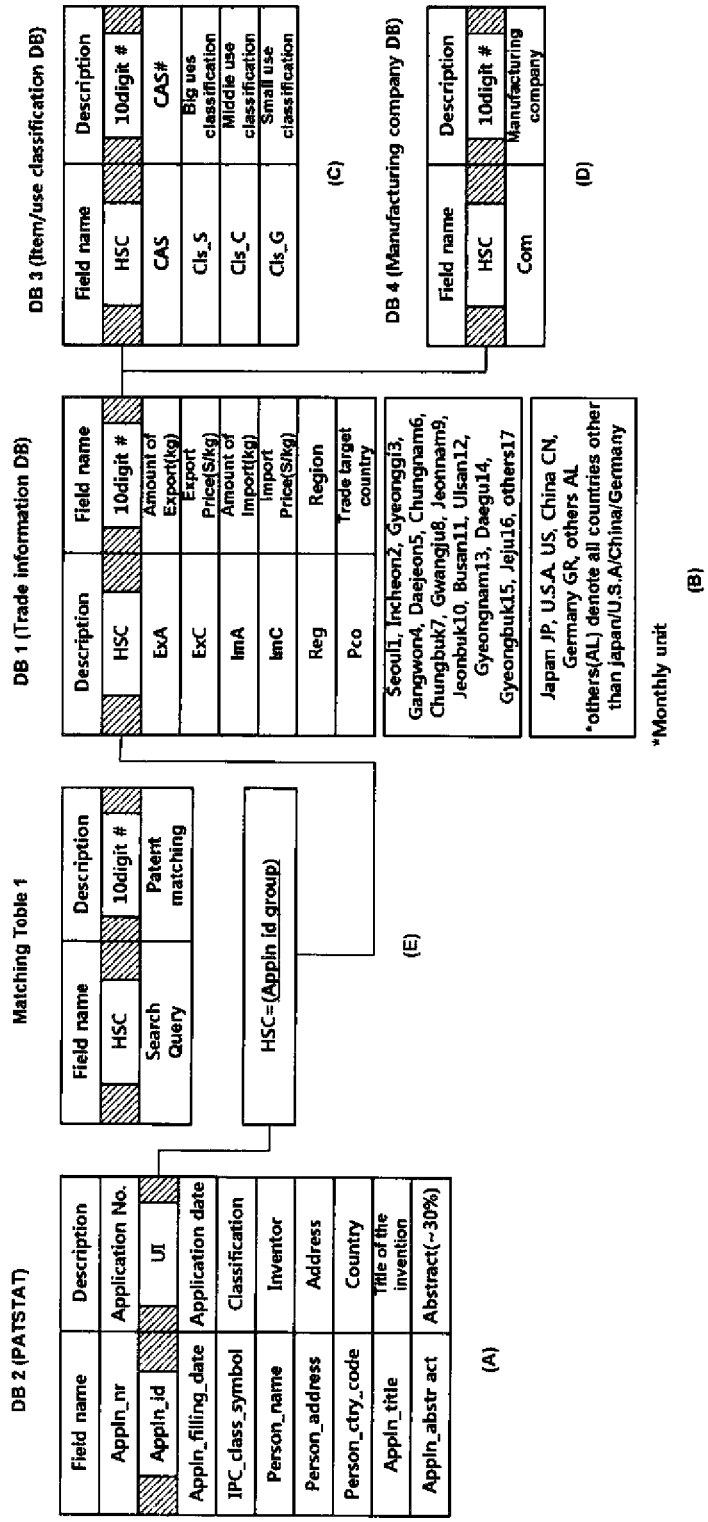

[FIG. 5]

| Field name | Description |
|---|---|
| Appln_nr | Application No. |
| Appln_id | ID |
| Appln_filling_date | Application date |
| IPC_class_symbol | Classification |
| Person_name | Inventor |
| Person_address | Address |
| Person_ctry_code | Country |
| Appln_title | Title of the invention |
| Appln_abstract | Abstract(~30%) |

| Patent search equation | Item | : Item name |
|---|---|---|
|  | 10.0000.0000 | A |
| Query=((sulfur ADJ(synth* OR manufact* OR pr epar*)tx) OR C01B17/00jpc) | 280200.0000 | Sulfur |
|  | 30.0000.0000 | B |
|  | 40.0000.0000 | C |
|  | . . . | . . . |
|  | n | z |

[FIG. 6]

| Item | Item name | CAS(Quality Code) | Use Medicine(H3#:) |
|---|---|---|---|
| 10.0000.0000 | A | 123-3-456 | |
| 280200.0000 | Sulfur | 7704-34-9 | Gunpowder(HS#:3833.22.0000(, Match(HS# : 3605.00.0000), Pesticide(HS# : 3808.00.0000), Dye(HS# : 3204.00.0000), Fluorescent raw material(HS# : xxxxxx.00000), Nylon(HS# : xxxxxx.0000), Bleach(HS# : xxxxx.0000)m, Rubber vulcanizing agent(HS# : xxxxxx.0000), Sulfurous acid pulp(HS# : xxxxxx.0000) etc. |
| | | | Carbon Disulfide(HS# : 2833.11.0000), Sulfite(HS# : 2833.11.0000), Sulfuric acid(HS# : 2831.10.0000), Sodium sulfide(HS# : xxxxxx.0000) etc. |
| 30.0000.0000 | B | 33-3-333 | |
| 40.0000.0000 | C | 1234-5-67 | |
| | . . . . . | 12-31-456 | |
| (2833.11.0000) | Carbon disulfide | 75-14-0 | |
| n | Z | 1-345-678 | |

[FIG. 7]
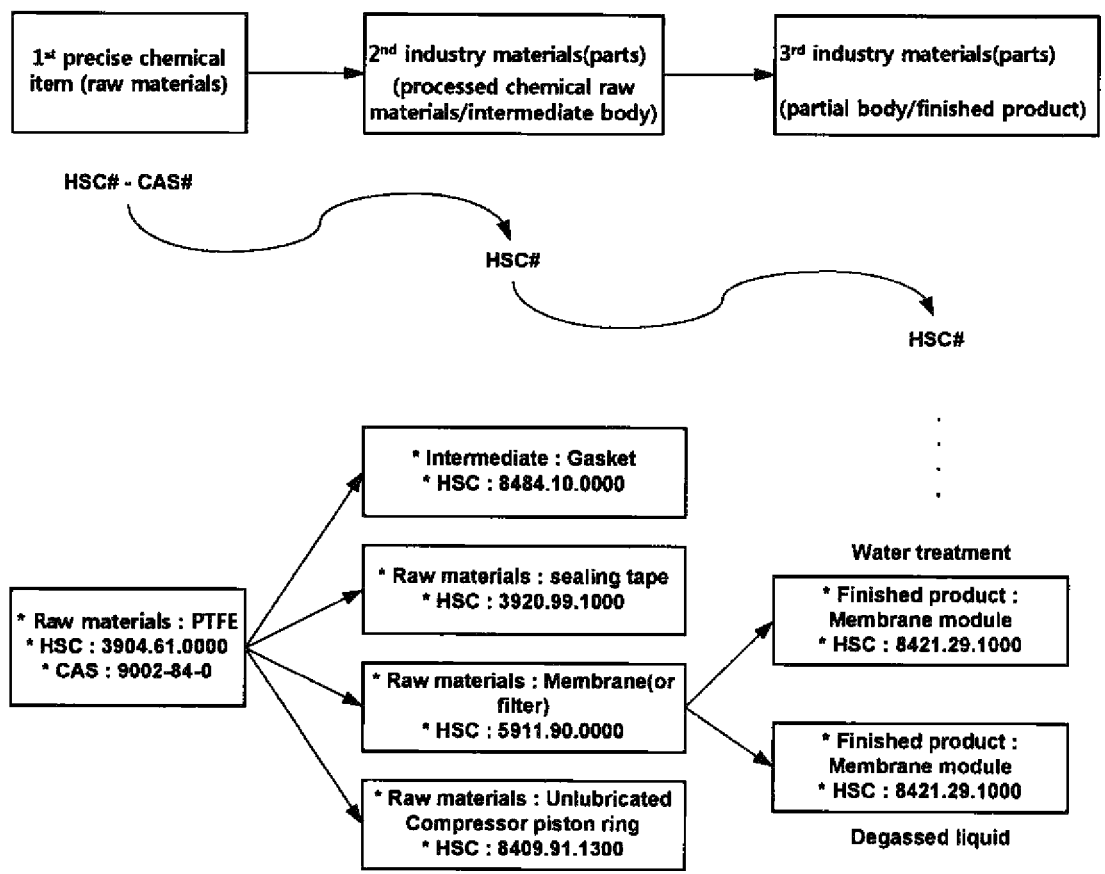

METHOD AND SYSTEM FOR CONSTRUCTING DATABASE FOR PRODUCT DEMAND/SUPPLY CONNECTION NETWORK

TECHNICAL FIELD

The present invention relates to a method and system for constructing a database for a product demand and supply connection network and, more particularly, to a method and system for constructing a database for a product demand/supply connection network into which the use of a product and the combinational and hierarchical characteristics of components have been incorporated, wherein related information, such as patent information, trade information, chemistry information, and manufacturing company information required for a product demand and supply connection network, is fetched over a communication network, matched with Harmonized System (HS) codes, and stored, and the related information matched with the HS codes is provided in the form of the hierarchical structure of a forward-oriented or backward-oriented demand/supply connection network.

BACKGROUND ART

Recently, as the use of the Internet is gradually expanded and communities within a space based on the Internet are formed, one of things that become more important is a technology for efficiently managing and integrating pieces of information and using the pieces of information.

Nevertheless, the mutual exchange of pieces of information through the Internet has not been integrated and managed, but is managed by the efforts of respective sites, and only users who are aware of the sites or who have rights capable of accessing the sites are able to obtain information. Furthermore, information that may be obtained like so is not sufficiently obtained to the extent that the information is satisfactory due to the physical limit of a site user.

That is, a current knowledge sharing system is problematic in that the system is constructed using a conventional Internet method, that is, a web bulletin board, search is performed by people having rights capable of accessing the bulletin board only within a corresponding site, and retrieved contents are specifically limited depending on the task property of a corresponding site provider.

Knowledge provided through the Internet, however, is explosively increased along with the development of networks. Accordingly, in order to remove inefficiency and a high cost in efforts and costs required for a search process when knowledge required for a user is to be searched for, there is a strong need for a knowledge database that may be shared. In order to provide excellent content in such an environment, considerable expenses and human power must be invested systematically and designedly. There has been a need for an efficient system capable of constructing a database using content based on users' spontaneous participation.

Meanwhile, a database for implementing a product demand and supply connection network can be constructed by incorporating the use of an individual constructed product and the combinational and hierarchical characteristics of elements into the database. In a current IT level, attempts have been made at artificial intelligence and semantic technologies, but an example in which the database has been constructed is not present.

DISCLOSURE

Technical Problem

An object of the present invention for solving the aforementioned disadvantages is to provide a method and system for constructing a database for a product demand/supply connection network into which the use of a product and the combinational and hierarchical characteristics of components have been incorporated, wherein related information, such as patent information, trade information, chemistry information, and manufacturing company information required for a product demand and supply connection network, is fetched over a communication network, matched with Harmonized System (HS) codes, and stored and the related information matched with the HS codes is provided in the form of the hierarchical structure of a forward-oriented or backward-oriented demand/supply connection network.

Technical Solution

In accordance with an aspect of the present invention for achieving the object, there is provided a method of constructing a database for a product demand/supply connection network in a technology market-associated analysis apparatus including a microprocessor controlling a construction of the database for implementing the product demand/supply connection network and the database for the product demand/supply connection network in which database-related information generated under a control of the microprocessor is stored, including the steps of (a) fetching, by the microprocessor, related information required for the product demand/supply connection network over a communication network; (b) extracting, by the microprocessor, information about the UI of patent information from the related information and matching the extracted UI information with a Harmonized System (HS) code; (c) matching, by the microprocessor, the HS code matched with the patent information with an HS code that is included in the related information and that is included in trade information; (d) matching, by the microprocessor, the HS code matched with the patent information with a Chemistry Abstract Service (CAS) registry number included in the related information; and (e) storing, by the microprocessor, related information in which the patent information, the HS code, and the CAS number have been matched with each other in the database for the product demand/supply connection network in the form of the hierarchical structure of a forward-oriented or backward-oriented demand/supply connection network.

Furthermore, the step (a) may include fetching, by the microprocessor, the patent information from a patent information providing apparatus, the HS code from a trade information providing apparatus, the CAS number from chemistry information providing apparatus, and manufacturing company information from a company information providing apparatus, with respect to the related information required for the product demand/supply connection network.

Furthermore, the step (d) may include matching, by the microprocessor, an HS code in which the patent information is matched with the CAS number with manufacturing company information included in the related information.

Furthermore, the hierarchical structure of the forward-oriented demand/supply connection network may be a structure in which the related information in which the patent information, the HS code, and the CAS number have been matched with each other is connected to raw materials of a product, the intermediate body of the product, the partial body of the product, and a finished product, thereby revealing what finished goods have been formed by the raw materials of the product.

Furthermore, the hierarchical structure of the backward-oriented demand/supply connection network may be a structure that reveals that a finished product has been formed through which process based on the related information in which the patent information, the HS code, and the CAS number have been matched with each other.

Meanwhile, in accordance with another aspect of the present invention for achieving the object, there is provided a system for constructing a database for a product demand/supply connection network which communicates with a patent information providing apparatus, a trade information providing apparatus, a chemistry information providing apparatus, and a company information providing apparatus over a communication network, including an information collection unit collecting related information required for the product demand/supply connection network from the patent information providing apparatus, the trade information providing apparatus, the chemistry information providing apparatus, and the company information providing apparatus over the communication network; a code matching unit matching information about the UI of the patent information, included in the related information, with a Harmonized System (HS) code, matching the HS code matched with the patent information with HS code that is included in the related information and that is included in the trade information, and matching the HS code matched with the patent information with a Chemistry Abstract Service (CAS) registry number included in the related information; a database storage space storing related information in which the patent information, the HS code, and the CAS number have been matched with each other; and a database control unit controlling the related information in which the patent information, the HS code, and the CAS number have been matched with each other so that the related information is stored in the database storage space, wherein the database control unit controls the related information in which the patent information, the HS code, and the CAS number have been matched with each other so that the related information is stored in the form of the hierarchical structure of a forward-oriented or backward-oriented demand/supply connection network.

Furthermore, the information collection unit may fetch the patent information from the patent information providing apparatus, the HS code from the trade information providing apparatus, the CAS number from the chemistry information providing apparatus, and manufacturing company information from the company information providing apparatus, with respect to the related information required for the product demand/supply connection network.

Furthermore, the code matching unit may match an HS code in which the patent information is matched with the CAS number with manufacturing company information included in the related information.

Furthermore, the hierarchical structure of the forward-oriented demand/supply connection network may be a structure in which the related information in which the patent information, the HS code, and the CAS number have been matched with each other is connected to raw materials of a product, the intermediate body of the product, the partial body of the product, and a finished product, thereby revealing what finished goods have been formed by the raw materials of the product.

Furthermore, the hierarchical structure of the backward-oriented demand/supply connection network may be a structure that reveals that a finished product has been formed through which process based on the related information in which the patent information, the HS code, and the CAS number have been matched with each other.

Advantageous Effects

In accordance with the present invention, related information, such as patent information, trade information, chemistry information, and manufacturing company information that are about a product to be searched for and that are required for a product demand and supply connection network, can be checked at a time.

Furthermore, patent information, trade information, chemistry information, and manufacturing company information related to a product can be matched by HS codes and CAS numbers and can be constructed into the hierarchical structure of a forward-oriented or backward-oriented demand/supply connection network.

Furthermore, a current information situation and related industry technology information for the raw materials, intermediate body, and partial body of a product to be searched for and the finished product of the product can be quickly checked, and technical development and a market tendency can be easily checked.

DESCRIPTION OF DRAWINGS

FIG. 1 is a block diagram illustrating an overall configuration of a system for constructing a database for a product demand/supply connection network in accordance with an embodiment of the present invention.

FIG. 2 is a block diagram schematically illustrating the functions of a technology market-associated analysis apparatus in accordance with an embodiment of the present invention.

FIG. 3 illustrates a flowchart for illustrating a method of constructing a database for a product demand/supply connection network in a technology market-associated analysis apparatus in accordance with an embodiment of the present invention.

FIG. 4 is a diagram illustrating an example of patent information, trade information, chemistry information, and manufacturing company information fetched over a communication network in accordance with an embodiment of the present invention.

FIG. 5 is a diagram illustrating an example in which patent information and chemistry information are matched with each other in accordance with an embodiment of the present invention.

FIG. 6 is a diagram illustrating an example in which HS codes matched with patent information are matched with the CAS numbers of chemistry information in accordance with an embodiment of the present invention.

FIG. 7 is a diagram illustrating the hierarchical structure of a forward-oriented demand/supply connection network in accordance with an embodiment of the present invention.

MODE FOR INVENTION

The details of the object and technical construction of the present invention and acting effects thereof will become more clearly understood from the following detailed description based on the drawings accompanied by the specification of the present invention. Hereinafter, embodiments of the present invention are described in detail with reference to the accompanying drawings.

FIG. 1 is a block diagram illustrating an overall configuration of a system for constructing a database for a product demand/supply connection network in accordance with an embodiment of the present invention.

Referring to FIG. 1, the system 100 for constructing a database for a product demand/supply connection network in accordance with an embodiment of the present invention includes a patent information providing apparatus 110, a trade information providing apparatus 120, a chemistry information providing apparatus 130, a company information providing apparatus 140, a technology market-associated analysis apparatus 150, and a product use providing apparatus 160.

In this case, the technology market-associated analysis apparatus 150 is an apparatus for constructing a database for a product demand/supply connection network in accordance with an embodiment of the present invention and providing analysis information associated with technology markets based on the constructed database. To this end, the technology market-associated analysis apparatus 150 communicate with the patent information providing apparatus 110, the trade information providing apparatus 120, the chemistry information providing apparatus 130, and the company information providing apparatus 140 over a communication network.

Furthermore, the patent information providing apparatus 110 is an apparatus for providing information related to patent and may be a server computer for providing patent information by the Patent Office or a civilian organization in each country. In the case of the Republic of Korea, the patent information providing apparatus 110 may be KIPRIS or WIPS, for example.

Furthermore, the trade information providing apparatus 120 may be a server computer for providing information related to trade by a trade institution, trade research worker, trade organization, or trade association in each country, for example. In particular, the trade information providing apparatus 120 provides Harmonized System (HS) codes that are included in information related to trade and that are about trade products.

Furthermore, the chemistry information providing apparatus 130 may be a server computer for providing information related to chemistry by a chemical institution, chemical organization, chemistry research worker, or chemical association in each country, for example. In particular, the chemistry information providing apparatus 130 provides Chemistry Abstract Service (CAS) registry numbers that are included in information related to chemistry and that are about corresponding products.

Furthermore, the company information providing apparatus 140 may be a server computer for providing information related to a manufacturing company, for example, a company name, a foundation date, the number of employees, yearly sales, manufacturing items, and export items. An example of the company information providing apparatus 140 may be the server computer of a stock exchange that provides information about companies on list or KOSDAQ companies.

Furthermore, the technology market-associated analysis apparatus 150 fetches patent information, trade information, chemistry information, and manufacturing company information over a communication network in order to construct a database for a product demand/supply connection network in accordance with an embodiment of the present invention, matches the pieces of information with each other based on HS codes, stores the pieces of matched information in a database storage space in the form of the hierarchical structure of a forward-oriented or backward-oriented demand/supply connection network, and constructs the database for the product demand/supply connection network into which the use of products and the combinational and hierarchical characteristics of components have been incorporated.

Furthermore, the product use providing apparatus 160 is an apparatus for providing products manufactured by manufacturing companies or the use of products distributed by distribution companies. The product use providing apparatus 160 may fetch the use of each product from a server or institution in technical association with the server or institution that provides the use of the product and may provide the use of each product to the technology market-associated analysis apparatus 150.

Furthermore, the communication network may include all of a wired communication network including the Internet, a mobile communication network, such as WCDMA or LTE, and a short-distance communication network, such as ZigBee or Wi-Fi.

FIG. 2 is a block diagram schematically illustrating the functions of the technology market-associated analysis apparatus in accordance with an embodiment of the present invention.

Referring to FIG. 2, the technology market-associated analysis apparatus 150 in accordance with an embodiment of the present invention includes a communication unit 210, an information collection unit 220, a code matching unit 230, a database storage space 240, and a database control unit 250.

The communication unit 210 is a hardware element responsible for a communication function for communication with the patent information providing apparatus 110, the trade information providing apparatus 120, the chemistry information providing apparatus 130, and the company information providing apparatus 140 over the communication network.

The information collection unit 220 collects pieces of related information required for a product demand/supply connection network from the patent information providing apparatus 11, the trade information providing apparatus 120, the chemistry information providing apparatus 130, and the company information providing apparatus 140 over the communication network.

That is, the information collection unit 220 fetches patent information from the patent information providing apparatus 110, HS codes from the trade information providing apparatus 120, CAS numbers from the chemistry information providing apparatus 130, and manufacturing company information from the company information providing apparatus 140 with respect to the pieces of related information required for the product demand/supply connection network.

Furthermore, the code matching unit 230 functions to match information about the UIs of the patent information, included in the pieces of related information required for the product demand/supply connection network, with Harmonized System (HS) codes, match the HS codes, matched with the patent information, with HS codes included in the trade information, and match the HS codes, matched with the patent information, with the Chemistry Abstract Service (CAS) registry numbers of the chemistry information.

Furthermore, the code matching unit 230 may match the HS codes, matched with the patent information and the CAS numbers, with the HS codes of the manufacturing company information.

The database storage space 240 stores the patent information fetched from the patent information providing apparatus 110, the HS codes fetched from the trade information providing apparatus 120, the CAS numbers fetched from the chemistry information providing apparatus 130, and the manufacturing company information fetched from the company information providing apparatus 140 over the communication network and also stores the pieces of related information in which the patent information is matched with the HS codes and the CAS numbers by the code matching unit 220.

The database control unit 250 may be implemented in the form of a hardware part, for example, a microprocessor. The database control unit 250 controls the pieces of related information in which the patent information is matched with the HS codes and the CAS numbers so that they are stored in the database storage space 230 and controls the pieces of related information in which the patent information is matched with the HS codes and the CAS numbers so that they are stored in the form of the hierarchical structure of a forward-oriented or backward-oriented demand/supply connection network.

In this case, the hierarchical structure of the forward-oriented demand/supply connection network may be called a combinational and hierarchical structure in which related information in which patent information, an HS code, and a CAS number have been matched with each other is connected to the raw materials of a product, the intermediate body of the product, the partial body of the product, and a finished product, thus revealing that what finished goods have been formed by the raw materials of the product.

Furthermore, the hierarchical structure of the backward-oriented demand/supply connection network may be called a structure that reveals that a finished product has been formed through which process based on related information in which patent information, an HS code, and a CAS number have been matched with each other.

FIG. 3 illustrates a flowchart for illustrating a method of constructing a database for a product demand/supply connection network in the technology market-associated analysis apparatus in accordance with an embodiment of the present invention.

Referring to FIG. 3, the database control unit 240 that belongs to the technology market-associated analysis apparatus 150 in accordance with an embodiment of the present invention and that corresponds to a microprocessor fetches related information required for the product demand/supply connection network over the communication network (S310).

That is, the database control unit 240 of the technology market-associated analysis apparatus 150 fetches patent information (A) from the patent information providing apparatus 110, HS code (B) from the trade information providing apparatus 120, a CAS number (C) from the chemistry information providing apparatus 130, and manufacturing company information (D) from the company information providing apparatus 140 with respect to the related information required for the product demand/supply connection network, as illustrated in FIG. 4.

In this case, the patent information providing apparatus 110 may be a server computer operated by European Patent Office, United States Patent and Trademark Office, or State Intellectual Property Office of P. R. China in order to provide patent information, for example.

In this case, FIG. 4 is a diagram illustrating an example of patent information, trade information, chemistry information, and manufacturing company information fetched over a communication network in accordance with an embodiment of the present invention. As illustrated in FIG. 4, the patent information includes an application No., an applicant, an application date, IPC classification, an inventor, an address, a country, the title of the invention, an abstract, etc. The trade information includes the amount of export, an export price, the amount of import, an import price, a region, trade target country, etc. The chemistry information includes a CAS number, big use classification, middle use classification, small use classification, etc.

Next, the database control unit 240 extracts information about the UI of the patent information from the fetched related information and matches the extracted UI information with the Harmonized System (HS) code of the trade information (S320), as illustrated in FIG. 5.

In this case, when the trade information is matched with the patent information as illustrated in FIG. 5 in the case of an item name "sulfur", for example, the database control unit 240 may match a HS code "280200.0000" with the UI of the patent information in a query way. FIG. 5 is a diagram illustrating an example in which patent information and chemistry information are matched with each other in accordance with an embodiment of the present invention. In FIG. 5, the HS code corresponding to sulfur is 280200.0000. The database control unit 240 matches the HS code of sulfur with the UI of the patent information through a patent search query so that although the patent information is updated, the corresponding patent information is able to be fetched through a query with consideration taken of a change of a newly applied patent. That is, when a patent search query is entered as illustrated in FIG. 5, the database control unit 240 fetches a patent identification number "Appln_id" and incorporates patent bibliography items, corresponding to the UI, into an analysis module.

Next, the database control unit 240 matches the HS code, matched with the patent information, with the Chemistry Abstract Service (CAS) registry number of the chemistry information (S330), as illustrated in FIG. 6.

That is, the database control unit 240 matches, for example, a CAS number "7704-34-9" that belongs to the chemistry information and that corresponds to sulfur with the HS code "280200.0000" corresponding to sulfur in the trade information, as illustrated in FIG. 6. FIG. 6 is a diagram illustrating an example in which HS codes matched with patent information are matched with the CAS numbers of chemistry information in accordance with an embodiment of the present invention. As illustrated in FIG. 6, the chemistry information includes a use according to the substance codes of the CAS numbers. Carbon bisulfide "HS#2833.11.0000" included in the use of the CAS number corresponding to the HS code "280200.0000" of sulfur may be derived as a separate HS code item.

In this case, the database control unit 240 may match the HS code in which the patent information is matched with the CAS number with an HS code of the manufacturing company information, as illustrated FIG. 4(D).

Furthermore, the database control unit 240 stores related information in which the patent information, the HS code, and the CAS number have been matched with each other in the database for the product demand/supply connection network in the form of the hierarchical structure of a forward-oriented or backward-oriented demand/supply connection network (S340).

In this case, as illustrated in FIG. 7, the hierarchical structure of the forward-oriented demand/supply connection network means a structure in which the related information in which the patent information, the HS code, and the CAS number have been matched with each other is connected to the raw materials of the product, the intermediate body of the product, and a finished product, thus revealing that what finished goods have been formed by the raw materials of the product. FIG. 7 is a diagram illustrating the hierarchical structure of the forward-oriented demand/supply connection network in accordance with an embodiment of the present invention. That is, as illustrated in FIG. 7, the hierarchical structure of the forward-oriented demand/supply connection network has, for example, a structure in which raw materials PTFE having an HS code "3904.61.0000" and a CAS number "9002-84-0" is connected to an intermediate gasket, raw materials "sealing tape", raw materials "membrane", and raw materials "unlubricated compressor piston ring", and the intermediate body of the raw materials "membrane" having an HS code "5911.90.0000" is connected to the finished product of a membrane module (for water treatment) having an HS code "8421.29.1000" and the finished product of a membrane module (for degassed liquid) having an HS code "8421.29.1000".

Furthermore, unlike the hierarchical structure of the forward-oriented demand/supply connection network, the hierarchical structure of the backward-oriented demand/supply connection network means a structure that reveals that finished goods have been formed through which process based on the related information in which the patent information, the HS code, and the CAS number have been matched with each other.

As described above, in accordance with the present invention, the method and system for constructing a database for a product demand/supply connection network can be achieved wherein related information, such as patent information, trade information, chemistry information, and manufacturing company information required for a product demand and supply connection network, is fetched over a communication network, matched by a Harmonized System (HS) code, and stored, and the related information matched by the HS code is formed in the form of the hierarchical structure of a forward-oriented or backward-oriented demand/supply connection network and incorporated into the use of a product and the combinational and hierarchical characteristics of components.

Those skilled in the art to which the present invention pertains will understand that the present invention may be implemented in various detailed forms without changing the technical spirit or indispensable characteristics of the present invention. It will be understood that the aforementioned embodiments are illustrative and not limitative from all aspects. The scope of the present invention is defined by the appended claims rather than the detailed description, and the present invention should be construed as covering all modifications or variations derived from the meaning and scope of the appended claims and their equivalents.

The invention claimed is:

1. A method of constructing a database for a product demand/supply connection network in a technology market-associated analysis apparatus comprising a microprocessor controlling a construction of the database for implementing the product demand/supply connection network and the database for the product demand/supply connection network in which database-related information generated under a control of the microprocessor is stored, the method comprising steps of:

(a) fetching, by the microprocessor, related information required for the product demand/supply connection network over a communication network, the related information including patent information, trade information, chemistry information, and manufacturing company information;

(b) extracting, by the microprocessor, information about an identifier of the patent information from the related information and matching the extracted identifier information with a Harmonized System (HS) code;

(c) matching, by the microprocessor, the HS code, which is matched with the patent information, with an HS code that is included in the trade information;

(d) matching, by the microprocessor, the HS code, which is matched with the patent information, with a Chemistry Abstract Service (CAS) registry number included in the related information; and (e) storing, by the microprocessor, related information in which the patent information, the HS code, and the CAS number have been matched with each other in the database for the product demand/supply connection network in a form of a hierarchical structure of a forward-oriented or backward-oriented demand/supply connection network, wherein the hierarchical structure of the forward-oriented demand/supply connection network is a structure in which the related information, in which the patent information, the HS code, and the CAS number have been matched with each other, is connected to raw materials of a product, an intermediate body of the product, a partial body of the product, and a finished product, thereby revealing what finished product have been formed by the raw materials of the product, and wherein the hierarchical structure of the backward-oriented demand/supply connection network is a structure in which the related information, in which the patent information, the HS code, and the CAS number have been matched with each other, is connected so that a process through which the finished product has been formed can be revealed.

2. The method of claim 1, wherein the step (a) comprises fetching, by the microprocessor, the patent information from a patent information providing apparatus, the HS code from a trade information providing apparatus, the CAS number from a chemistry information providing apparatus, and the manufacturing company information from a company information providing apparatus, with respect to the related information required for the product demand/supply connection network.

3. The method of claim 1, wherein the step (d) comprises matching, by the microprocessor, an HS code, in which the patent information is matched with the CAS number, with the manufacturing company information included in the related information.

4. A system for constructing a database for a product demand/supply connection network which communicates with a patent information providing apparatus, a trade information providing apparatus, a chemistry information providing apparatus, and a company information providing apparatus over a communication network, the system comprising:

at least one hardware processor;

an information collector loaded on the at least one hardware processor and collecting related information required for the product demand/supply connection network from the patent information providing apparatus, the trade information providing apparatus, the chemistry information providing apparatus, and the company information providing apparatus over the communication network, the related information including patent information, trade information, chemistry information, and manufacturing company information;
a code matcher loaded on the at least one hardware processor and matching information about an identifier of the patent information, included in the related information, with a Harmonized System (HS) code, matching the HS code, which is matched with the patent information, with an HS code that is included in the trade information, and matching the HS code, which is matched with the patent information, with a Chemistry Abstract Service (CAS) registry number included in the related information;
a database storage storing related information in which the patent information, the HS code, and the CAS number have been matched with each other; and
a database controller loaded on the at least one hardware processor and controlling the related information in which the patent information, the HS code, and the CAS number have been matched with each other so that the related information is stored in the database storage, wherein the database controller controls the related information in which the patent information, the HS code, and the CAS number have been matched with each other so that the related information is stored in a form of a hierarchical structure of a forward-oriented or backward-oriented demand/supply connection network,
wherein the hierarchical structure of the forward-oriented demand/supply connection network is a structure in which the related information, in which the patent information, the HS code, and the CAS number have been matched with each other, is connected to raw materials of a product, an intermediate body of the product, a partial body of the product, and a finished product, thereby revealing what finished product have been formed by the raw materials of the product, and
wherein the hierarchical structure of the backward-oriented demand/supply connection network is a structure in which the related information, in which the patent information, the HS code, and the CAS number have been matched with each other, is connected so that a process through which the finished product has been formed can be revealed.

5. The system of claim 4, wherein the information collector fetches the patent information from the patent information providing apparatus, the HS code from the trade information providing apparatus, the CAS number from the chemistry information providing apparatus, and the manufacturing company information from the company information providing apparatus, with respect to the related information required for the product demand/supply connection network.

6. The system of claim 4, wherein the code matcher matches an HS code, in which the patent information is matched with the CAS number, with the manufacturing company information included in the related information.

* * * * *